United States Patent
Jang et al.

(10) Patent No.: US 9,461,316 B2
(45) Date of Patent: Oct. 4, 2016

(54) SYSTEM AND METHOD FOR CONTROLLING DEHYDRATION OF FUEL CELL STACK

(71) Applicants: Hyundai Motor Company, Seoul (KR); INHA-Industry Partnership Institute, Incheon (KR)

(72) Inventors: In Woo Jang, Seongnam-si (KR); Sun Bo Shim, Seoul (KR); Sung Ho Lee, Seongnam-si (KR); Hyun Chul Ju, Incheon (KR)

(73) Assignees: HYUNDAI MOTOR COMPANY, Seoul (KR); INHA INDUSTRY PARTNERSHIP INSTITUTE, Incheon (KR)

( * ) Notice: Subject to any disclaimer, the term of this patent is extended or adjusted under 35 U.S.C. 154(b) by 196 days.

(21) Appl. No.: 14/326,000

(22) Filed: Jul. 8, 2014

(65) Prior Publication Data

US 2015/0162626 A1     Jun. 11, 2015

(30) Foreign Application Priority Data

Dec. 10, 2013 (KR) ........................ 10-2013-0153509

(51) Int. Cl.
*H01M 8/04* (2016.01)

(52) U.S. Cl.
CPC ..... *H01M 8/04126* (2013.01); *H01M 8/04014* (2013.01); *H01M 8/04097* (2013.01); *Y02E 60/50* (2013.01)

(58) Field of Classification Search
CPC .................... H01M 8/04097; H01M 8/04126; H01M 8/04014
See application file for complete search history.

(56) References Cited

U.S. PATENT DOCUMENTS

2013/0108936 A1*  5/2013  McElroy ............. H01M 8/0668
                                                             429/410

FOREIGN PATENT DOCUMENTS

| JP | 2609952 B2 | 5/1997 |
|---|---|---|
| JP | 2003-229165 A | 8/2003 |
| JP | 2011-151043 A | 8/2011 |
| JP | 4964368 B2 | 6/2012 |
| KR | 10-2012-0053306 A | 5/2012 |
| KR | 10-2012-0110945 A | 10/2012 |

* cited by examiner

*Primary Examiner* — Stewart Fraser
(74) *Attorney, Agent, or Firm* — McDermott Will & Emery LLP

(57) ABSTRACT

A system and method for controlling dehydration of a fuel cell stack include a fuel cell stack including an anode which receives hydrogen from a hydrogen supplier and a cathode which receives air from an air supplier. A reactor collects hydrogen and oxygen discharged from the fuel cell stack so that the collected hydrogen and oxygen are reacted, thereby increasing relative humidity of hydrogen supplied to the anode, and thus raising water content of the catalytic layer of the anode.

6 Claims, 5 Drawing Sheets

SYSTEM AND METHOD FOR CONTROLLING DEHYDRATION OF FUEL CELL STACK

CROSS-REFERENCE(S) TO RELATED APPLICATION

The present application claims the benefit of priority to Korean Patent Application Number 10-2013-0153509 filed on Dec. 10, 2013, the entire contents of which is incorporated herein for all purposes by this reference.

TECHNICAL FIELD

The present disclosure relates to a system and method for controlling dehydration of a fuel cell stack, and more particularly, to a system and method for controlling dehydration of a fuel cell stack, wherein hydrogen and oxygen discharged from the fuel cell stack are collected, heated, humidified, and supplied, thereby controlling the dehydration of the fuel cell stack.

BACKGROUND

A fuel cell vehicle includes a fuel cell stack formed by stacking a plurality of fuel cells serving as a power source, a fuel supply system for supplying a hydrogen fuel to the fuel cell stack, an air supply system for supplying oxygen as an oxidant necessary for an electrochemical reaction, a water/heat management system for controlling the temperature of the fuel cell stack, etc.

The fuel supply system is configured such that the compressed hydrogen inside a hydrogen tank is decompressed and then supplied to a fuel electrode (an anode) of the stack. The air supply system is configured such that external air sucked by an air blower is supplied to an air electrode (a cathode) of the stack.

When hydrogen and oxygen are respectively supplied to the fuel electrode and the air electrode of the stack, hydrogen ions are separated through a catalytic reaction at the fuel electrode. The separated hydrogen ions are transferred to an oxidation electrode which is the air electrode via the electrolyte membrane, and the hydrogen ions separated at the fuel electrode may cause an electrochemical reaction together with electrons and oxygen at the oxidation electrode, thereby obtaining electric energy. Specifically, electrochemical oxidation of hydrogen occurs at the fuel electrode, and electrochemical reduction of oxygen takes place at the air electrode. In this case, when the produced electrons move, electric power and heat are created, and water vapor or water is produced by a chemical action for combining the hydrogen with the oxygen.

A discharge device is provided to discharge hydrogen and oxygen which do not react with impurities such as water vapor, water, and heat generated during the production of electric energy of the fuel cell stack, and gases such as water vapor, hydrogen, and oxygen are discharged to the atmosphere via the exhaust path.

The constructions for operating the fuel cells, including an air blower, a hydrogen recirculation blower, a water pump, etc., are connected to a main bus terminal to facilitate starting of the fuel cells. The main bus terminal may be connected with a variety of relays which make it easy to turn power on and off, and a diode for preventing a reverse current from flowing to the fuel cells.

Dry air supplied using the air blower is humidified by a humidifier and supplied to the cathode (the air electrode) of the fuel cell stack. Exhaust gas of the cathode is transferred in a state of being humidified by water generated internally to the humidifier, and thus may be used to humidify the dry air to be supplied to the cathode by the air blower.

Cold starting of a fuel cell vehicle freezes and accumulates ice and frost, and dehydrates the anode. Upon cold starting, a water backflow rate may decrease, and humidification is limitedly generated due to very low saturated water vapor pressure.

SUMMARY

The present disclosure has been made keeping in mind the above problems encountered in the related art. An aspect of the present disclosure provides a system and method for controlling dehydration of a fuel cell stack, wherein dehydration of the fuel cell stack may be controlled by increasing temperature and humidity of hydrogen or air discharged from the fuel cell stack.

According to an exemplary embodiment of the present disclosure, a system for controlling dehydration of a fuel cell stack includes a fuel cell stack including an anode which receives hydrogen from a hydrogen supplier and a cathode which receives air from an air supplier. A reactor collects hydrogen and oxygen discharged from the fuel cell stack so as to carry out a reaction between the collected hydrogen and oxygen.

Hydrogen or oxygen, depending on relative amounts of the collected hydrogen and oxygen, may be produced together with heat and water by the reaction.

Temperature and humidity of the produced hydrogen or oxygen may be increased by the produced heat and water.

The hydrogen having the increased temperature and humidity may be mixed with hydrogen supplied to the anode, or the oxygen having the increased temperature and humidity may be mixed with the air supplied to the cathode.

The mixed hydrogen may be supplied to the anode or the mixed air may be supplied to the cathode.

The reactor may include a heat exchanger which performs heat exchange between the collected hydrogen and oxygen.

The reactor may further include a humidifier for humidifying hydrogen having increased temperature by the heat exchange.

According to another embodiment of the present disclosure, a method of controlling dehydration of a fuel cell stack includes collecting hydrogen and oxygen discharged from the fuel cell stack. Hydrogen, which is heated and humidified using the collected hydrogen and oxygen, is further supplied to an anode of the fuel cell stack.

The hydrogen which is heated and humidified using water and heat generated by a reaction between the collected hydrogen and oxygen to the anode of the fuel cell stack or air containing oxygen which is heated and humidified to a cathode of the fuel cell stack, may be supplied.

Hydrogen, which is heated and humidified using heat exchange of the collected hydrogen and oxygen and humidification of the heated hydrogen, may be further supplied to the anode of the fuel cell stack.

BRIEF DESCRIPTION OF THE DRAWINGS

The above and other objects, features and advantages of the present disclosure will be more clearly understood from the following detailed description taken in conjunction with the accompanying drawings.

DETAILED DESCRIPTION

Figure 1:
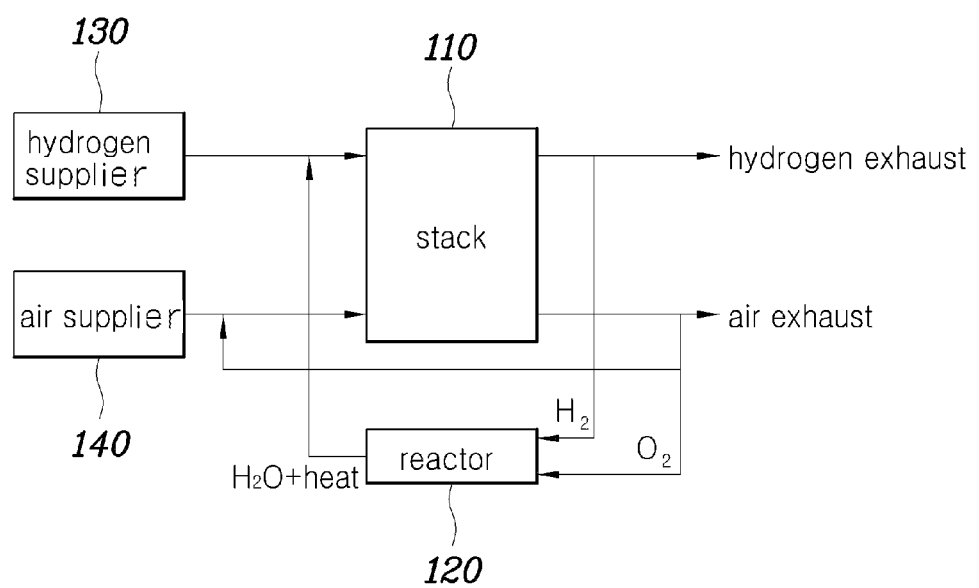
FIGS. 1 to 4 are views illustrating a system for controlling dehydration of a fuel cell stack according to an embodiment of the present disclosure.

Specific structural or functional expressions for embodiments of the present disclosure disclosed herein or in the present application are merely used to describe embodiments according to the present disclosure, which are set forth to variously illustrate, but are not to be construed as limiting the present disclosure.

Embodiments according to the present disclosure may be variously modified and may have a variety of forms, and thus, specific embodiments are illustrated in the drawings and described in detail herein or in the present application. However, the following description does not limit the present disclosure to specific embodiments and should be understood to include all variations, equivalents, or substitutions within the spirit and scope of the present disclosure.

In the description, the terms "first" and/or "second" may be used to describe a variety of elements but such elements are not defined by the above terms. These terms are used to distinguish any one element from another element, and for example, the first element may be referred to as the second element, and similarly, the second element may be referred to as the first element, within the scope of the present invention.

Furthermore, throughout the description, the case where any one element is "connected" or "joined" to another element will be understood to incorporate not only the case where any one element is directly connected or joined to another element but also the case where a further element is interposed between the above two elements. On the other hand, the case where any one element is "directly connected" or "directly joined" to another element will be understood that a further element is not interposed therebetween. The other expressions which describe the relationship between the elements, for example, "between" and "directly between," or "adjacent to" and "directly adjacent to" should be interpreted similarly.

The terms used herein are merely intended to explain specific embodiments and not to limit the present disclosure. Unless otherwise stated, the singular expression includes a plural expression. In this application, the terms "include" or "have" are used to designate the presence of features, numbers, steps, operations, elements, parts, or combinations thereof described herein, and should be understood so as not to exclude presence or additional probability of one or more different features, numbers, steps, operations, elements, parts, or combinations thereof.

Unless otherwise defined, all of the terms used herein including technical or scientific terms have the same meanings as those typically understood by persons having ordinary knowledge in the art to which the present disclosure belongs. The terms such as those defined in general dictionaries should be construed to match to the meanings in the contexts of the related art, and should not be interpreted ideally or exaggeratedly as the formal meanings, unless obviously defined herein.

Hereinbelow, a detailed description will be given of preferred embodiments of the present disclosure with reference to the appended drawings. Throughout the drawings, the same reference numerals refer to the same members.

FIGS. 1 to 4 illustrate a system for controlling dehydration of a fuel cell stack according to an embodiment of the present disclosure.

Referring to FIGS. 1 to 4, the system 100 for controlling dehydration of a fuel cell stack according to an embodiment of the present disclosure may include a fuel cell stack 110, a reactor 120, a hydrogen supplier 130, and an air supplier 140.

Figure 2:
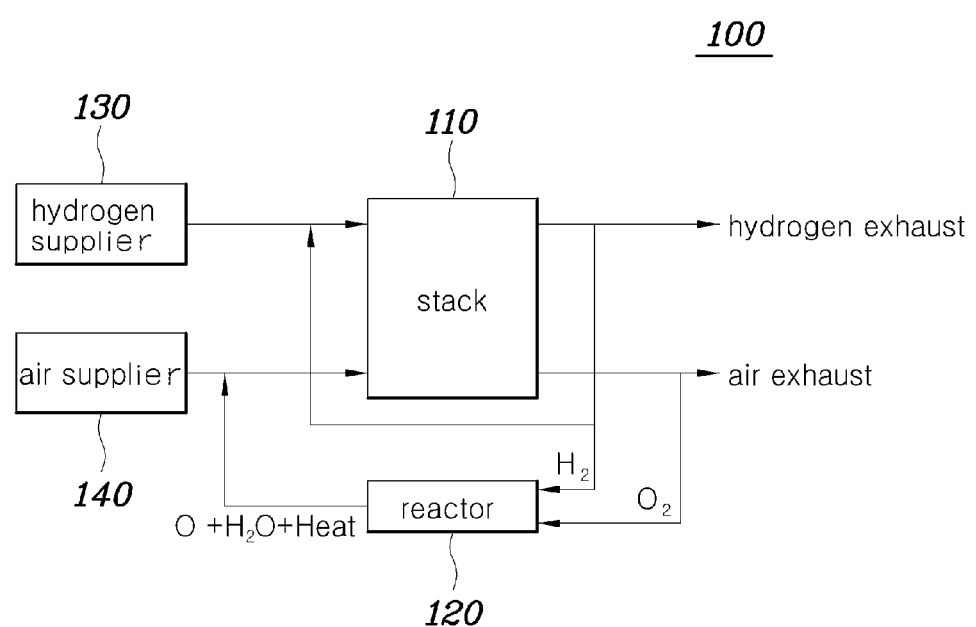

The fuel cell stack 110 includes an anode which receives hydrogen from the hydrogen supplier 130 and a cathode which receives air from the air supplier 140. The reactor 120 collects the hydrogen and oxygen discharged from the fuel cell stack 110, so that the collected hydrogen and oxygen are reacted. Depending on the relative amounts of the collected hydrogen and oxygen, when the amount of the collected hydrogen is greater than that of the collected oxygen under conditions of $O_2$ depletion, the hydrogen is produced together with water and heat. Also, when the amount of the collected oxygen is greater than that of the collected hydrogen under conditions of $H_2$ depletion, the oxygen is produced together with water and heat. The production of the hydrogen is illustrated in FIG. 1, and the production of the oxygen is illustrated in FIG. 2. In the case where hydrogen is produced, dehydration of the anode may be prevented, and in the case where the oxygen is produced, dehydration of the cathode may be prevented.

The reaction scheme of hydrogen and oxygen illustrated in FIG. 1 is as follows.

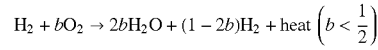

$$H_2 + bO_2 \rightarrow 2bH_2O + (1-2b)H_2 + \text{heat}\left(b < \frac{1}{2}\right)$$

In the above scheme, b is a coefficient in chemical formulas for the collected oxygen to adjust a molar ratio of the chemical formulas, and has a value of less than ½. Unlike this, oxygen is produced instead of hydrogen in an embodiment illustrated in FIG. 2.

The temperature and humidity of the produced hydrogen or oxygen are increased by the heat and water ($H_2O$) generated in the reactor 120. Of high-temperature and high-humidity hydrogen or oxygen, the temperature and humidity of which are increased, the hydrogen may be mixed with low-temperature hydrogen supplied to the anode from the hydrogen supplier 130, and the oxygen may be mixed with low-temperature air supplied to the cathode from the air supplier 140.

The hydrogen having relatively higher temperature and humidity compared to the low-temperature hydrogen is supplied to the anode, and the air having relatively higher temperature and humidity containing high-temperature high-humidity oxygen compared to the low-temperature air is supplied to the cathode.

Figure 3:
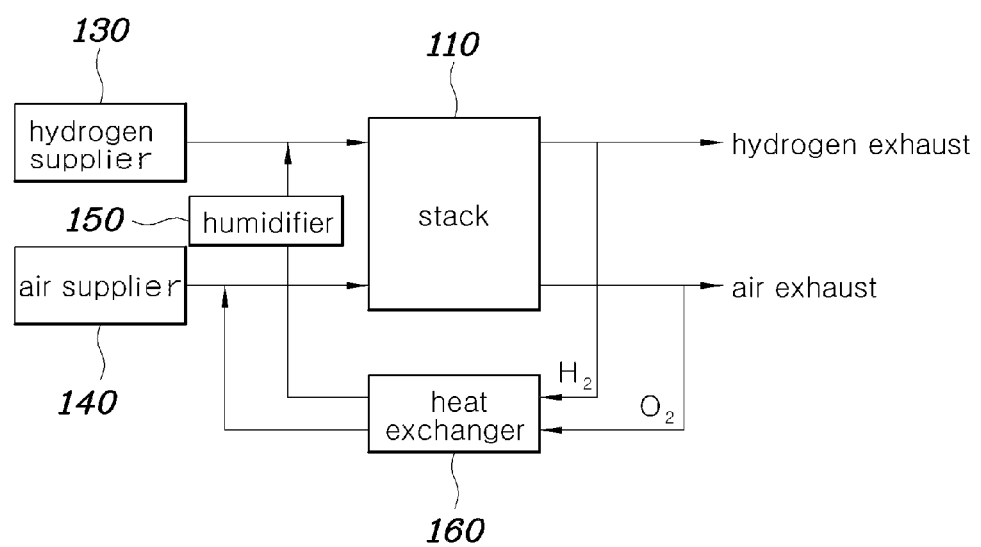
Figure 4:
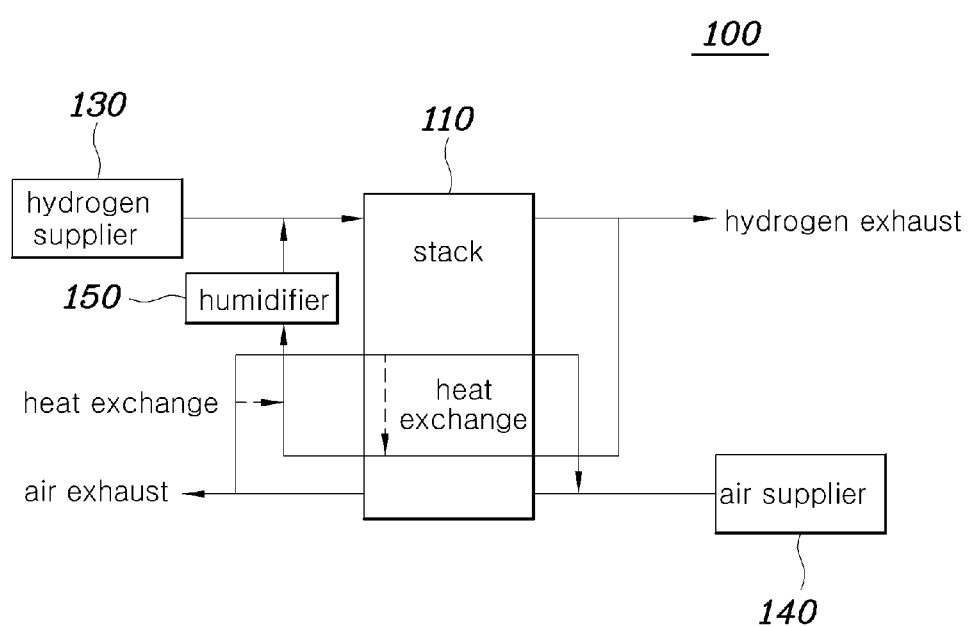

With reference to FIGS. 3 and 4, the reactor 120 may further include a heat exchanger 160 which implements heat exchange between the collected hydrogen and oxygen, and a humidifier 150 for humidifying hydrogen the temperature of which is increased via heat exchange. FIG. 3 illustrates the system 100 (co-flow configuration) for controlling dehydration of the fuel cell stack when the hydrogen supplier 130 and the air supplier 140 are positioned at the same direction. Also, FIG. 4 illustrates the system 100 (counter-flow configuration) for controlling dehydration of the fuel cell stack when the hydrogen supplier 130, and the air supplier 140 are positioned at different directions based on the fuel cell stack.

Of hydrogen and oxygen discharged from the fuel cell stack 110, the temperature of the discharged oxygen is comparatively higher than that of the discharged hydrogen. Thus, in the case where heat exchange is carried out in the heat exchanger 160, the temperature of hydrogen is increased and the relative humidity thereof is further lowered. The hydrogen which is heated by passing through the heat exchanger 160 passes through the humidifier 150. Since humidification efficiency of the humidifier 150 is increased in proportion to a decrease in the relative humidity of gas passing through the humidifier 150, the humidification efficiency for the hydrogen having the lowered relative humidity is increased.

In the case of hydrogen which is not heated, it has low temperature, and thus is low in water saturated water vapor pressure, thereby making it difficult to perform efficient humidification. However, it is possible to perform efficient humidification by lowering the relative humidity of the heated hydrogen by the heat exchange between hydrogen and oxygen in the heat exchanger 160. While the hydrogen, which is heated and humidified, is subsequently mixed with hydrogen newly supplied from the hydrogen supplier 130, the relative humidity of gas supplied to the fuel cell stack 110 is also increased, thus preventing dehydration of the anode.

Figure 5:
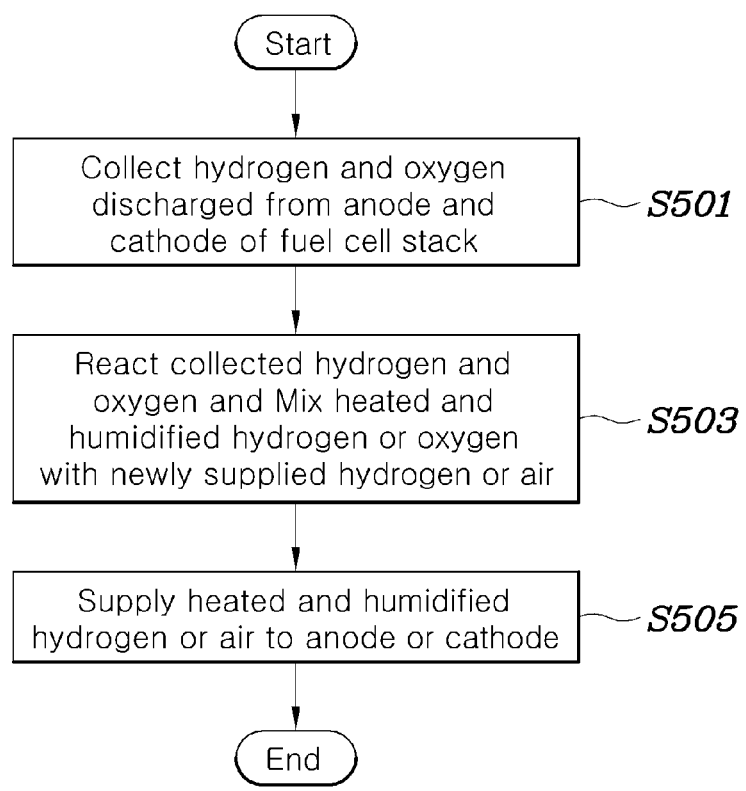
FIG. 5 is a flowchart illustrating a process of controlling dehydration of a fuel cell stack according to an embodiment of the present disclosure.

FIG. 5 is a flowchart illustrating a process of controlling dehydration of a fuel cell stack according to an embodiment of the present disclosure. A method of controlling dehydration of the fuel cell stack 110 includes collecting hydrogen and oxygen discharged from the fuel cell stack 110 (S501). The hydrogen is heated and humidified using water and heat generated by a reaction between the collected hydrogen and oxygen in the case where the amount of hydrogen is greater. The heated hydrogen may be mixed with new hydrogen supplied from the hydrogen supplier 130 (S503). The mixed hydrogen or air is then supplied to the anode of the fuel cell stack 110 (S505). Alternatively, air containing oxygen, may be heated and humidified and supplied to the cathode of the fuel cell stack 110 in the case where the amount of oxygen is greater.

By heat exchange of the collected hydrogen and oxygen and humidification of the heated hydrogen using a humidifier 150, the hydrogen, which is heated and humidified, may be supplied to the anode of the fuel cell stack 110.

As described hereinbefore, the present disclosure provides a system and method for controlling dehydration of a fuel cell stack. According to the present disclosure, relative humidity of hydrogen supplied to an anode can be increased, thereby raising water content of a catalytic layer of an anode.

By heat exchange between hydrogen discharged from the anode and oxygen discharged from a cathode, hydrogen discharged from the anode can be heated, humidified again, mixed with low-temperature hydrogen gas newly supplied, and then supplied to the anode, thereby preventing dehydration of the anode.

Using heat and water produced through the reaction between hydrogen discharged from the anode and oxygen discharged from the cathode, the hydrogen or the oxygen is mixed with hydrogen from a hydrogen supplier or oxygen from an oxygen supplier, and thus, the mixed hydrogen is supplied to the anode, and the mixed oxygen is supplied to the cathode, thereby preventing the dehydration of the anode and the cathode.

Although the exemplary embodiments of the present disclosure depicted in the drawings have been disclosed for illustrative purposes, those skilled in the art will appreciate that various modifications, additions, and substitutions are possible, without departing from the scope and spirit of the disclosure as disclosed in the accompanying claims.

What is claimed is:

1. A system for controlling dehydration of a fuel cell stack, the system comprising:
    a fuel cell stack comprising an anode which receives hydrogen from a hydrogen supplier and a cathode which receives air from an air supplier; and
    a reactor which collects hydrogen and oxygen discharged from the fuel cell stack to carry out a reaction between the collected hydrogen and oxygen,
    wherein the reactor includes: a heat exchanger which performs heat exchange between hydrogen and oxygen discharged from the fuel cell stack, so that a temperature of the discharged hydrogen is increased by the heat exchange; and a humidifier humidifying the discharged hydrogen having the increased temperature and supplying the discharged hydrogen, which has the increased temperature and is humidified, to the anode of the fuel cell stack.

2. The system of claim 1, wherein hydrogen or oxygen, depending on relative amounts of the collected hydrogen and oxygen, is produced together with heat and water by the reaction.

3. The system of claim 2, wherein temperature and humidity of the produced hydrogen or oxygen are increased by the produced heat and water.

4. The system of claim 3, wherein the hydrogen having the increased temperature and humidity is mixed with hydrogen supplied to the anode, or the oxygen having the increased temperature and humidity is mixed with air supplied to the cathode.

5. The system of claim 4, wherein the mixed hydrogen is supplied to the anode or the mixed air is supplied to the cathode.

6. A method of controlling dehydration of a fuel cell stack, the method comprising:
    collecting hydrogen and oxygen discharged from the fuel cell stack;
    exchanging heat between the collected hydrogen and oxygen discharged from the fuel cell stack to increase a temperature of the discharged hydrogen;
    humidifying the discharged hydrogen having the increased temperature; and
    supplying the discharging hydrogen, which has the increased temperature and humidified, to an anode of the fuel cell stack.

* * * * *